United States Patent [19]

Christensen et al.

[11] Patent Number: 5,226,300
[45] Date of Patent: Jul. 13, 1993

[54] REFRIGERANT RECYCLING APPARATUS, METHOD AND SYSTEM

[75] Inventors: James P. Christensen; Richard F. Gordon, both of Salt Lake City, Utah

[73] Assignee: Ozone Environmental Industries, Inc., Salt Lake City, Utah

[21] Appl. No.: 931,709

[22] Filed: Aug. 17, 1992

Related U.S. Application Data

[63] Continuation-in-part of Ser. No. 558,805, Jul. 27, 1990, Pat. No. 5,138,847.

[51] Int. Cl.⁵ .................................................. F25B 45/00
[52] U.S. Cl. .................................................. 62/77; 62/292
[58] Field of Search .................................. 62/77, 149, 292

[56] References Cited

U.S. PATENT DOCUMENTS

| | | | |
|---|---|---|---|
| 2,341,430 | 2/1944 | Elsey | 62/179 |
| 3,232,070 | 2/1966 | Sparano | 61/149 |
| 3,299,648 | 1/1967 | White et al. | 62/77 |
| 3,461,686 | 8/1969 | Andersen | 62/510 |
| 3,602,002 | 3/1971 | Bailey et al. | 62/53 |
| 3,699,781 | 10/1972 | Taylor | 62/474 |
| 3,732,070 | 5/1973 | Vietorisz | 263/19 R |
| 4,261,178 | 4/1981 | Cain | 62/149 |
| 4,266,408 | 5/1981 | Krause | 62/474 |
| 4,285,206 | 8/1981 | Koser | 62/126 |
| 4,363,222 | 12/1982 | Cain | 62/292 |
| 4,476,688 | 10/1984 | Goddard | 62/149 |
| 4,528,826 | 7/1985 | Avery, Jr. | 62/503 |
| 4,539,817 | 9/1985 | Staggs et al. | 62/149 |
| 4,637,881 | 1/1987 | Sciuto | 210/689 |
| 4,698,983 | 10/1987 | Hechavarria | 62/292 |
| 4,745,772 | 5/1988 | Ferris | 62/292 |
| 4,766,733 | 8/1988 | Scuderi | 62/77 |
| 4,809,515 | 3/1989 | Houwink | 62/149 |
| 4,938,031 | 7/1990 | Manz et al. | 62/145 |

OTHER PUBLICATIONS

*Pulling Profits Out of Thin Air*, Brochure, Robinair, Meatpelier, Ohio (1991) 7 pages.
*Air-Cooled Condensing Units High Temperature Models R-22*, Brochure, Copeland Corporation, Sidney, Ohio, Form 90-109R2, (1990), 6 pages.
Pinnacle Refrigerant Recovery & Purification Unit, Advertisement, MDI, Wheat Ridge, Colo. (Apr. 1990) 2 pages.
*Refrigernat Recovery and Recycling Station*, Advertisement, Model No. 17200, Robinair, Montpelier, Ohio, (1988), 2 pages.
*Refrigerant Management System*, Advertisement, Imperial Eastman, 2 pages. (Date Unknown).
*Multiple Refrigerant Recovery Center*, Advertisement, Model 01620, 1 page. (Date Unknown).
*Refrigerant Recovery Recycling Center*, Advertisement, Model 01060, 1 page, (Date Unknown).
01050 *Refrigerant Recovery Recycling Center*, Advertisement, White Industries, 2 pages, (Date Unknown).

(List continued on next page.)

*Primary Examiner*—William E. Tapolcai
*Attorney, Agent, or Firm*—Workman, Nydegger & Jensen

[57] ABSTRACT

The invention comprises an apparatus, a method and a system for recovering and purifying a refrigerant contained in a refrigerator, an air conditioning system, a storage tank, or other source. The refrigerant is flowed sequentially through a purifying device, an expansion valve for controlling the flow of the refrigerant, one or two heat exchangers wherein heat is exchanged to convert the refrigerant into a gaseous phase, a second purifying device for separating oil from the refrigerant, a compressor-pump, a third purifying device for filtering moisture, acids, and particulates, and a moisture indicator monitors the amount of moisture present in the recovered refrigerant. The refrigerant then may be flowed into a receiving tank, and thence dispensed therefrom back into the refrigerant source, a storage tank, or recirculated again through the apparatus. The apparatus also comprises means for leak testing the refrigerant source, and for pressure-clearing obstacles from the refrigerant source.

32 Claims, 4 Drawing Sheets

OTHER PUBLICATIONS

*If you're Toying With the Idea of Buying a Reclaimer... Don't buy a Toy*, Advertisement, Van Steenburgh Engineering Laboratories, Inc., Denver, Colo., 1 page, (Date Unknown).

*The Most Advanced Equipment For A.C. Recycling And Charging, the Supervamp*, Advertisement, Mastercool U.S.A., Inc., Rockaway, N.J., 1 page, (Date Unknown).

Operating Instructions, *4-Valve System Analyzer*, Imperial Eastman, Imperial Division, Chicago, Ill., Form No. 08461402, 1 page. (Date Unknown).

*The Fully Portable Refrigerant Management System*, Advertisement, Imperial Eastman, 2 pages, (Date Unknown).

Portion of Catalog, Robinair, 12 pages, (Date Unknown).

*Refrigerant Recovery/Recycle Equipment*, Chart, 2 pages, (Date Unknown).

REFRIGERANT RECYCLING APPARATUS, METHOD AND SYSTEM

BACKGROUND

1. Related Application

This patent application is a continuation-in-part of copending patent application Ser. No. 07/558,805, filed Jul. 27, 1990, U.S. Pat. No. 5,138,847 in the name of Scott Sean Rollins and entitled REFRIGERANT RECOVERY AND PROCESSING APPARATUS AND METHODS which is incorporated herein by specific reference.

2. Field of the Invention

The present invention relates to apparatus, methods, and systems utilized to recovery and purify fluid refrigerant contained in an external refrigerant source such as a household or industrial refrigerator, a household or industrial freezer, a household or industrial air conditioner, an automotive air conditioner, a storage tank, or other similar source.

3. Related Technology

The fluid refrigerant commonly used today typically comprises a family of compounds called chlorofluorocarbons (CFCs). Some common of these CFCs are identified as R12, R22, R500, and R502, each CFC being specifically tailored for specific applications. For example, R12 is commonly used for small systems such as automotive and appliance systems while R502 is commonly used for industrial air conditioner and refrigeration systems, and for recreation vehicles and refrigerated trucks.

During usage, it is important that the refrigerants be kept relatively free of foreign matter such as oil, water and air since the systems generally rely on pressure to keep the refrigerant compressed, and it is vital that hermetic integrity be maintained. Therefore, when the refrigerants become contaminated, it becomes necessary to replace or purify the refrigerants. It has been a common practice in the past to simply discharge the contaminated refrigerant (a colorless, odorless gas) into the atmosphere and to replace it with fresh refrigerant. This discharge not only wasted the relatively expensive refrigerant, but as has recently been discovered, may also have contributed significantly to the breakdown of the ozone layer of the earth's atmosphere.

One answer has been to remove the refrigerant from its source and to purify it in a separate apparatus. It can then be reintroduced into its original source or stored in a storage tank for future use.

A number of purification apparatuses devised to accomplish this have been described in U.S. Pat. Nos. such as 3,232,070, 3,699,781, 4,363,222, 4,539,817, and 4,938,031. Some commercial purifiers have been marketed utilizing the teachings of one or more of these patents. However, these commercial purifiers have tended to be bulky, heavy, and costly. Furthermore, the degree of purification achieved by some of them has been less than desirable. In addition, while filter units have been employed which must be replaced after a certain amount of usage, these filter units have typically been positioned inside the purifying apparatus in an inaccessible position, necessitating the use of tools by an operator to access and replace the filter unit.

While it is known to recover and recycle refrigerant as described in U.S. Pat. No. 3,232,070, this early system only removes the refrigerant, filters and dries it, then condenses the refrigerant for storage in an external holding tank. The system described in this reference lacks the capacity to reintroduce the refrigerant back into the appliance after repairs have been performed; moreover, it provides no design for cleaning the refrigerant before it enters the recovery apparatus. The result is that the recovery compressor which is employed in the purifying apparatus is exposed to all of the contaminants that the refrigerant has accumulated, thereby shortening the life of the recovery compressor and preventing any recycling of the refrigerant.

Attempts to lessen the maintenance requirements by filtering the pressurized vapor before it passed through the compressor pump of the recovery unit have led to another problem. To pass the volatile refrigerant through the newly developed filters required an increase in pressure. This increase in turn, required stronger filters. This ever increasing spiral eventually has led to the development of heavy armored filters. The increase in pressure required by the filters precipitated a concomitant increase in the wall thickness of the conduits used to transport the refrigerant. While these filters lengthened the life of the compressor pump, they added substantially to the weight of the recovery device, thereby making the recovery device more difficult to transport.

Furthermore, because of the strength required to withstand the pressure and the need to be airtight, filters are often difficult to access. Cleaning these filters increases the maintenance needs of the refrigerant recovery device and service intervals are often difficult to determine owing to the variable amount of contaminant issuing from each disabled refrigeration unit.

Each possibly disabling malfunction of a refrigeration unit introduces differing amounts of impurities into the refrigerant. These impurities may rapidly build up to the point that the filter can no longer purify the gas or may become clogged. In the event that these filters become blocked, the requisite vacuum needed to draw materials through them will eventually overtax the pump, thereby damaging it or resulting in an explosion. These higher pressure systems expose technicians to the dangers of explosion and other risks such as eye and skin damage inherent with gases accidentally released under high pressure.

Further adding to the maintenance difficulties of these devices is the lack of any counting device to remind technicians of the need to clean the filters and perform other maintenance chores. Several technicians may use the same refrigerant recovery device on jobs producing varying amounts of impurities to be filtered. This lack of ability to record usage, may lead to compressor failure due to clogging in the filters from lack of proper care and maintenance.

The refrigeration source is also often located in inaccessible locations, thereby making it very difficult, or even impossible, to transport the typical purification apparatus to a position where the refrigerant may be removed. Even so called "portable" devices in use today weigh over 150 pounds and require permanent mounting to a two-wheel hand truck or dolly for transport, discouraging their use in inaccessible and tight areas. In such cases it sometimes becomes necessary to utilize two apparatuses, one, on-site, that merely removes the refrigerant from its source and places it in a temporary storage tank, and a second one, off-site, that accomplishes the purification.

Another problem with some contemporary apparatuses is the lack of any means for determining the degree of purity that has been achieved. It is often necessary to reduce the moisture content of the refrigerant to a predetermined acceptable value. With no moisture indicator, the operator cannot determine whether or not the purification has been effected satisfactorily.

Another problem with typical contemporary apparatuses is the fact that no self-effecting means are incorporated for assuring that the refrigerant is substantially vaporized before it enters an oil separator preceding the compressor unit. The oil separator will not function well if liquid enters.

Another problem with some contemporary apparatuses is the fact that oil from the compressor, which typically enters the refrigerant stream and exits the compressor, is not recirculated back into the compressor, necessitating the frequent replenishment of oil in the compressor.

Another problem with some contemporary apparatuses is the fact that no means is incorporated for reintroducing refrigerant, after it has been purified, back into the refrigerant source in the state of a pressurized liquid. With such apparatuses it must be reintroduced in a gaseous state. This requirement necessitates the use of an extra conduit and valve system, and evaporation means, increasing the cost and complexity of the operation.

Further, with contemporary apparatuses the condenser performs all needed cooling of the refrigerant before entering into a receiving tank. This necessitates a relatively large condenser, and also wastes heat which might otherwise be utilized in the purification process.

Yet another problem with some contemporary apparatuses is the omission of any means for leak testing the refrigerant source before, or after, reintroducing purified refrigerant back into the source. This omission necessitates the need for transporting an extra item of equipment to the refrigerant source in order to determine if leaks are present.

Still another problem with some contemporary apparatuses is the omission of means for removing foreign obstructing particles from the refrigerant source prior to the introduction of purified refrigerant. Oftentimes such particles get into the refrigerant pathway, and should be removed, usually by flowing a pressurized medium, such as air or nitrogen, therethrough.

BRIEF SUMMARY AND OBJECTS OF THE INVENTION

It is an object of the present invention to provide a portable refrigerant recycling apparatus, method and system for purifying refrigerant that is truly portable and lightweight as compared to contemporary apparatuses. As an example, and not to be considered as limiting, it is preferred that the portable apparatus weigh less than 70 pounds, be equipped with a handle, and have dimensions which allow it to pass through standard doorways with ease.

It is another object of the invention to provide a shop apparatus wherein the elements are mounted on a hand truck, which weighs less than 170 pounds.

Yet another object of the present invention is to provide an apparatus that incorporates disposable filter units positioned such that they are readily accessible.

A further object of the present invention is to provide an apparatus so sized as to permit the purification of most refrigerants to be effected in a single pass.

It is still another object of the present invention to provide an apparatus, method, and system that permits the recirculation of the refrigerant through the apparatus a sufficient number of times, when a single pass is not sufficient, until a desired degree of purity has been effected.

It is still another object to provide an apparatus that incorporates means for determining when the moisture content of the refrigerant has been reduced to a predetermined acceptable value.

It is still another object of the present invention to provide an apparatus that may incorporate a usage indicator configured so as to give an operator an indication as to when filter units should be replaced.

It is still another object to provide an apparatus that substantially removes moisture from the refrigerant prior to introduction of the refrigerant into an oil separator unit.

It is still another object to provide an apparatus that incorporates self-effecting means for assuring that the refrigerant is substantially vaporized before it enters the oil separator unit.

Another object is to provide an apparatus that purifies a variety of refrigerants including, but not limited to, R12, R22, R500, and R502.

A further object is to provide an apparatus that incorporates means for separating compressor-pump oil from the refrigerant after it has flowed through the compressor-pump, and recirculates it back into the compressor-pump, the means preferably comprising capillary tubing.

It is still another object to provide an apparatus that permits the reintroduction of purified refrigerant back into the refrigerant source in a predominantly pressurized liquid state.

It is still another object to provide an apparatus that incorporates means for leak testing the refrigerant source prior to reintroduction of purified refrigerant back into the source.

It is still another object to provide an apparatus that incorporates means for removing foreign obstructing particles from the refrigerant source prior to reintroduction of purified refrigerant back into the source.

A still further object of the present invention is to provide a novel, lightweight, portable refrigerant recovery apparatus and methods capable of blowing out obstructions in a blocked system.

In order to accomplish these objectives, a new and novel purification apparatus has been invented that is portable, lightweight, small-sized, and versatile in that all of the above objectives can be obtained in a single embodiment. However, some specialized embodiments are also provided in order to satisfy certain specific customer preferences. For example, one embodiment for use in a shop facility is provided with a housing having wheels, configured so as to be peculiarly compatible with such facilities, while another embodiment is provided, specifically for purifying only certain refrigerants, such as R22, which is somewhat less costly than the more universal embodiment. As another example, one embodiment is provided which has a larger compressor-pump, primarily intended for large capacity systems. Additional embodiments may omit one or more elements of the system. However, all these embodiments represent merely variations of the basic invention. The shop embodiment will be described first, with the other embodiments to follow.

Shop Embodiment

The presently preferred embodiment of the present invention comprises, in functionally sequential order, an input conduit system, a first purifying device, an expansion valve, a primary heat exchanger, a secondary heat exchanger, a second purifying device, a compressor-pump, a condenser, a third purifying device, a moisture indicator, and an output conduit system. Additionally a compressor-pump oil recirculation system, interconnecting conduit systems, a usage indicator, miscellaneous safety devices, and, in some embodiments, an expansion valve control device may also be incorporated.

The input conduit system preferably comprises a manifold having incoming hoses for connecting to the refrigerant source and an outgoing hose for connecting to the utility apparatus. Preferably one or two pressure gauges are placed therein so as to monitor the pressure in the incoming hose(s), thus serving as leak detectors and serving to determine when all refrigerant has been removed from the refrigerant source.

The first purifying device is a filter, preferably a disposable filter, configured so as to remove moisture, and particulates from the flow of refrigerant therethrough. This filter is preferably sized such that when the refrigerant is in a vapor phase, a single pass of refrigerant through the apparatus is sufficient to purify the refrigerant to the required value. When the refrigerant is in a fluid phase, more filters are necessary. This filter is preferably placed so as to be readily accessible to an operator without the use of tools. The filter may, for example, be placed exterior to the housing, may be located behind an opening, or may be positioned in a pocket.

The expansion valve, in communication with the first purifying device, is configured so as to allow incoming refrigerant, gaseous or liquid, to expand to a predominantly gaseous state. (As used in this specification, the word "predominantly" means "mostly", greater than 50%). The expansion valve may be a pressure reducing valve.

The expansion valve control device senses the temperature of a portion of one, or both, heat exchangers of the system, or refrigerant flowing therethrough, and develops a control signal as a function of said temperature(s). The control signal is then transmitted to the expansion valve, which then controls the rate of flow of liquid therethrough in response to the control signal. The control is adjusted so as to assure that the refrigerant flowing from the heat exchangers is in a substantially gaseous phase.(as used in this specification the word "substantially" means completely, or almost completely, greater than approximately 90%.) The expansion valve control device may comprise a temperature sensing bulb containing a fluid, such as freon, which has a pressure dependent on its temperature. The pressure of the fluid serves as the control signal.

From the expansion valve, the refrigerant flows to a primary heat exchanger, which preferably comprises a primary outer chamber surrounding a primary core chamber. In practice, refrigerant which has flowed through the expansion valve is preferably flowed through the primary outer chamber where the refrigerant is heated so as to enter a vaporized state. Once through the outer chamber, the refrigerant is flowed to a secondary heat exchanger.

The secondary heat exchanger likewise has a secondary outer chamber and a secondary core chamber. Refrigerant from the first heat exchanger is preferably flowed through the secondary outer chamber for further heating. From the secondary outer chamber, the refrigerant is flowed to a second purifying device wherein oil is separated from the refrigerant to an area where it can be discharged.

From the second purifying device, the refrigerant passes to a compressor pump which is configured so as to produce a vacuum at its inlet, and a pressure at its outlet. Preferably, this item is of the positive displacement type. The refrigerant enters the compressor-pump in a substantially gaseous phase and exits the compressor-pump preferably in a pressurized predominantly gaseous phase.

From the compressor pump, the refrigerant flows back to the secondary heat exchanger and into the secondary core chamber. The refrigerant flowing in the secondary core chamber is at this point at a higher temperature than the refrigerant flowing in the outer chamber. Because of this, heat is exchanged from the refrigerant in the core chamber to the refrigerant in the outer chamber. This exchange of heat further serves to vaporize the refrigerant within the outer chamber, making the refrigerant more gaseous while cooling the refrigerant in the core chamber.

The refrigerant is then flowed from the secondary core chamber of the secondary heat exchanger to the primary core chamber of the primary heat exchanger. Again, the refrigerant in the primary core chamber is at a higher temperature than the refrigerant in the primary outer chamber. Thus, a heat exchange occurs between the refrigerant streams as they pass each other within the primary heat exchanger thereby further assuring the vaporization of the refrigerant in the primary outer chamber to a substantially gaseous phase while cooling the refrigerant in the primary core chamber.

The cooled gaseous refrigerant is then flowed from the primary core chamber of the primary heat exchanger to a condenser. The condenser is configured so as to receive the pressurized substantially gaseous refrigerant and cool and condense it to a pressurized predominantly liquid phase. Within the condenser are cooling coils over which forced air is blown by a fan in order to cool the coils. The refrigerant is cooled to a predominantly liquid phase as it passes over the cooled coils.

This pressurized condensed refrigerant is then flowed through a third purifying device, which, in the preferred embodiment, is a filter. The filter is preferably a disposable filter, and is positioned so as to be readily accessible without the use of tools. Once the refrigerant is flowed through the third purifying device, the moisture content of the refrigerant is tested. This occurs by a use of an indicator paper positioned at the output end of the third purifying device. This indicator paper assumes a particular color dependent upon the degree of moisture detected. A sight glass cover allows the operator to view the indicator paper.

The pressurized, condensed, predominantly liquid refrigerant may then be flowed into a receiving tank. The receiving tank is preferably equipped with, or engaged with, a quantity-sensing device which senses the amount of refrigerant in the tank, and is equipped with control means which removes power from the compressor-pump when the quantity of liquid in the tank reaches approximately 80%, or some other predetermined value, of capacity. Preferably a float is incorporated in the tank which determines the level of liquid in the tank. Alternatively a weighing device may be employed which weighs the quantity of refrigerant in the tank.

It is also within the scope of the invention that the refrigerant may flow from the third purifying device to an output conduit system directly into a storage tank. Thus an output conduit system is configured so as to permit the operator to connect the third purifying device with the external refrigerant source, with the atmosphere, with a storage tank, or with the input conduit system for recirculation. This system may comprise a hose and a valve in communication with the condenser.

Interconnecting conduit systems are also employed as necessary. The systems may incorporate hoses or tubing, and also a valve placed at the output of the first filter, and a valve placed at the input to the second filter.

Miscellaneous safety devices may also be incorporated within the scope of the present invention. These may include a thermal motor protector, a current overload protector, a high pressure cut-out, a manual reset circuit breaker, and a fuse. These are configured and connected so as to remove power from the apparatus in the event pre-established parameters become excessive. Such devices are normally required by Underwriters Laboratories.

Likewise a usage indicator may be employed which monitors the degree of usage, or the time of usage, or the number of usages, as an aid in determining when the filters need to be replaced. Preferably this comprises an hour meter.

Lastly, a housing is employed. Typically, but not necessarily, the housing will comprise a cover and a hand truck, with the whole weighing less than 170 pounds.

The invention also comprises a slightly simplified embodiment, suitable for some applications, wherein the secondary heat exchanger is omitted along with its interconnecting conduit system. This system could be utilized for applications limited to certain refrigerants, such as R22.

Portable Embodiment

This embodiment of the invention is housed so as to be portable, with no wheels or hand truck. The apparatus elements are the same as for the shop embodiment except that the receiving tank and its associated quantity-sensing device are not included within the housing. However, the associated power shut-off relay is contained within the housing. The housing employs a cover and a carrying handle, and the apparatus is configured so as to weigh less than 70 pounds.

These and other objects and features of the present invention will become more fully apparent from the following description and appended claims, or may be learned by the practice of the invention.

BRIEF DESCRIPTION OF THE DRAWINGS

Reference is next made to a brief description of the drawings, which are intended to illustrate embodiments of the present invention with respect to the manner of making and using same in its presently understood best mode. The drawings and the detailed description which follow are intended to be merely illustrative and not otherwise limiting of the scope of the invention as set forth in the appended claims.

DETAILED DESCRIPTION OF THE INVENTION

The present invention provides a refrigerant recycling apparatus designed to be of such size and weight as to permit the apparatus to be highly portable, and designed so as to efficiently recover and purify refrigerants. The sequence by which the refrigerant flows through the apparatus will be discussed below with reference to the Figures.

Figure 1:
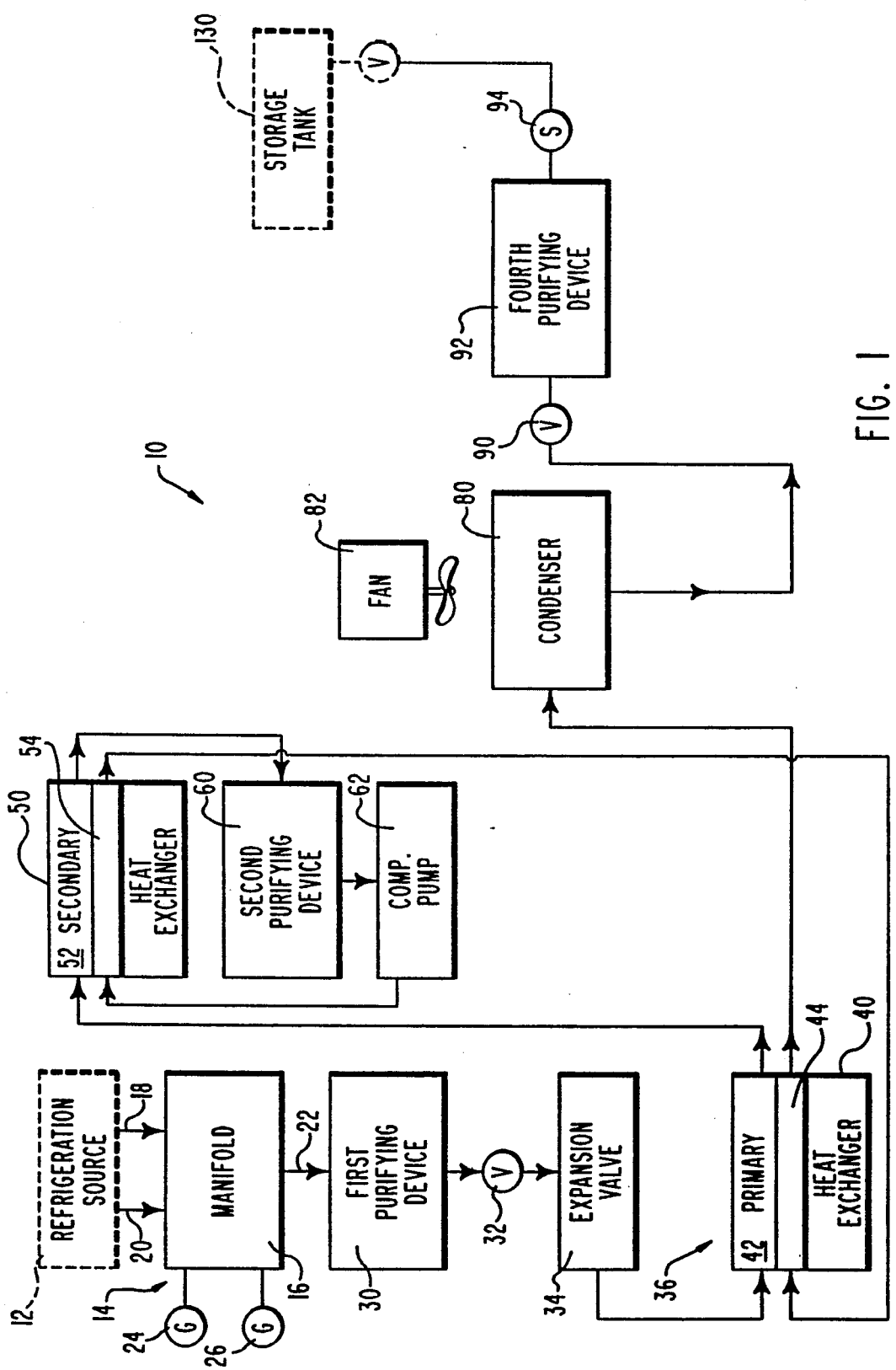
FIG. 1 is a schematic diagram of a preferred embodiment of the refrigerant recycling apparatus within the scope of the present invention.

As shown in FIG. 1, the refrigerant recycling apparatus or system 10 is connected to a source of refrigerant 12. The source of refrigerant 12 may be a refrigeration or air conditioner unit or simply a storage tank. The refrigerant provided by refrigerant source 12 may be either contaminated refrigerant which needs purification, or clean refrigerant that simply needs transferring to a new storage container. The flow of refrigerant though the apparatus is depicted in the Figures by arrows.

The refrigerant enters the refrigerant recycling apparatus of the present invention from the refrigerant source 12 through an input conduit system 14. Input conduit system 14 comprises a manifold 16, incoming flexible hoses 18 and 20, outgoing flexible hose 22, and pressure gauges 24 and 26. Other valves and hoses may be employed as desired.

Incoming flexible hoses 18 and 20 connect the manifold 16 to the refrigerant source 12. Pressure gauges 24 and 26 are connected to the manifold 16 and are used to detect when all the refrigerant has been emptied from refrigerant source 12. The refrigerant exits manifold 16 through an outgoing flexible hose 22 in communication therewith.

It can be appreciated that it is within the scope of the present invention that the input conduit system 14 may simply comprise a single hose connecting the refrigerant source 12 to the refrigerant recycling apparatus. Any connector between the refrigerant source and the refrigerant recycling apparatus which allows the refrigerant to flow from the first to the second is within the scope of the present invention.

The refrigerant flowing through the conduit system 14 may be in a gaseous state, a liquid state, or a combination of both.

Following the flow through input conduit system 14, the refrigerant flows through a first purifying device 30, which is connected to manifold 16 by outgoing flexible hose 22. In the preferred embodiment, first purifying device 30 is preferably positioned within the apparatus such that it can be readily accessed by an operator, so as to provide ease of replacement after a certain amount of usage. As the refrigerant flows through first purifying device 30, various contaminants such as moisture and particulates are at least partially removed. In the present invention, first purifying device 30 filters incoming refrigerant before the refrigerant is pressurized. By filtering out acid before the refrigerant passes through a compressor-pump, the compressor-pump is greatly extended, and the system in general is relieved of the stresses produced from corrosion. First purifying device 30 may have any one of a number of purifying substances contained therein. In the preferred embodiment, the first purifying device is a disposable filter comprised of a generally cylindric body shell having therein a desiccant bed of dessicant beads. Within shell 44 is a desiccant bed of desiccant beads. The desiccant beads may be compacted or positioned in a relatively loose state in relation to each other. It has been found that if the beads are in a loose state, and may "dance" about as refrigerant is passed through the filter, the desiccant beads will have an increased capability to cleanse the refrigerant of impurities since more of the surface area of the beads will contact the refrigerant. Although the beads are present in a loose state, it should be understood that there should be a sufficient amount of beads present in the filter so that the refrigerant is cleansed.

The desiccant beads may be of any suitable desiccant material such as alumina, activated carbon, or other material such as is typically utilized in a filter for absorbing moisture, acid and other contaminants from any refrigerant flowing therethrough. In the presently preferred embodiment, the desiccant beads comprise a mixture of activated alumina and the compound known, and available, to those skilled in the art as 4A-XH-6. The ratio of the activated alumina to the AHX6 is in the range from about 30/70 to about 70/30. Most preferably, the ratio of the activated alumina to the 4A-XH-6 is about 50/50. The filter may also comprise a porous stone filter with carboniferous activated charcoal packing. Such filters are known in the industry and are not further described herein. The filter currently used in the preferred embodiment is #2010, supplied by Parker-Hannifen.

Following its flow through first purifying device 30, the refrigerant preferably flows through a shut-off valve 32, and thence through an expansion valve 34. Shut-off valve 32 prevents backflow from expansion valve 34 to first purification device 30. It is also believed that shut-off valve, when shut, functions to allow the filter of first purifying device 30 to be removed and replaced without allowing refrigerant to escape from the system.

Expansion valve 34 is configured so as to begin to transform the refrigerant to a predominantly gaseous phase. Expansion valve 34 reduces the pressure of the refrigerant liquid as it travels through expansion valve 34, thereby causing the refrigerant liquid to flash into a vapor. Expansion valve 34 may be either an automatic pressure reducing expansion valve, or a thermostatic, temperature sensing expansion valve. The thermostatic expansion valve senses the temperature of a portion of one, or both, heat exchangers of the system, or refrigerant flowing therethrough, and develops a control signal as a function of said temperature(s). The control signal is then transmitted to the expansion valve, which then controls the rate of flow of liquid therethrough in response to the control signal. The control is adjusted so as to assure that the refrigerant flowing from the heat exchangers is in a substantially gaseous phase. The expansion valve control device may comprise a temperature sensing bulb containing a fluid, such as freon, which has a pressure dependent on its temperature. The pressure of the fluid serves as the control signal.

Following its passage through the expansion valve 34, the refrigerant flows through a primary heat exchanger 40. Primary heat exchanger 40 comprises a primary outer chamber 42, which surrounds a primary core chamber 44. Primary core chamber 44 is comprised of a coil of copper tubing placed within the heat exchanger. From expansion valve 34, the refrigerant flows through primary outer chamber 42 and over the coils of primary core chamber 44. As the predominantly gaseous refrigerant from expansion valve 34 flows through the primary outer chamber, the refrigerant is heated, and the refrigerant is converted into a vapor state.

The primary heat exchanger may comprise any suitable commercial device. One such is Refrigeration Research Model H50, supplied by Refrigeration Research, 525 North Fifth Street, Brighton, Mich., 48116.

Following its passage through primary outer chamber 44 of the primary heat exchanger 40, the refrigerant then flows through a secondary heat exchanger 50. Heat exchanger 50 comprises a secondary out chamber 52 which surrounds a secondary core chamber 54. The refrigerant flows from the primary outer chamber 42 to secondary outer chamber 52. As the incoming predominantly gaseous refrigerant flows through secondary outer chamber 52, the refrigerant is further heated to ensure vaporization of the refrigerant.

The secondary heat exchanger may comprise any suitable commercial device. In the preferred embodiment, the secondary heat exchanger 50 is the Refrigeration Research Model H50, supplied by Refrigeration Research, 525 North Fifth Street, Brighton, Mich., 48116.

The substantially gaseous refrigerant then flows through a secondary purifying device 60. In a preferred embodiment, secondary purification device 60 comprises a separator for separating oil and moisture from the refrigerant. Secondary purification device 60 may comprises any one of a number of commercial separators available on the market for separating oil and moisture from refrigerant. One such is a Temprite Model Number 900.3, supplied by Temprite, 1555 Hawthorne Lane, Chicago, Ill., 60185. It is important to note that the refrigerant must be in a substantially gaseous state as it flows into the first separator for proper functioning of the separator.

From the second purification device 60, the refrigerant next flows through a compressor-pump 62, wherein the refrigerant is pressurized so as to be in a pressurized predominantly gaseous state. Compressor pump 62 is configured so as to produce a vacuum at its inlet and a pressure at its outlet. The refrigerant enters the compressor-pump in a substantially gaseous phase and exits the compressor pump preferably in a pressurized predominantly gaseous phase. The compressor-pump may be any one of several suitable commercial models, preferably being a positive displacement type. One such compressor-pump as used currently is Model No. MMJH-0025-1AA-100, supplied by Copeland Corp., Sidney, Ohio, 45365.

From the compressor pump 62, the refrigerant flows back to secondary heat exchanger 50 and into secondary core chamber 54. The refrigerant flowing through secondary core chamber 54 is at a higher temperature than the refrigerant flowing through secondary outer chamber 52. Because of this, heat is exchanged from the refrigerant in secondary core chamber 54 to the refrigerant in secondary outer chamber 52, thus serving to further heat and further assure vaporization of the refrigerant in secondary outer chamber to a substantially gaseous phase while cooling the refrigerant flowing through secondary core chamber 54.

The refrigerant is then flowed from the secondary core chamber 54 back to the primary core chamber 44 of primary heat exchanger 40. Again, the refrigerant in primary core chamber 44 is at a higher temperature than the refrigerant in primary outer chamber 42, thereby causing a heat exchange to occur between the two refrigerants. As in secondary heat exchanger described above, as the refrigerant in primary outer chamber 42 is heated, it is further moved to the gaseous phase, while the refrigerant passing through primary core chamber 44 is cooled. From the primary core chamber of primary heat exchanger 40, the refrigerant passes to a condenser 80, wherein the refrigerant is cooled and condensed so as to be in a predominantly liquid state. As illustrated in FIG. 1, an electrically driven fan 82 is mounted adjacent condenser 80 to force ambient air cover condensing coils within condenser 80.

The pressurized, condensed, predominantly liquid refrigerant is next flowed through a valve 90 and into a third purifying device 92. Third purifying device 92 is, in the preferred embodiment within the scope of the present invention, a disposable filter preferably positioned such that it can be readily accessed by an operator. Third purifying device 92 functions to remove moisture, acids, and other particulates from the liquid refrigerant passing therethrough. In the preferred embodiment, third purifying device is a larger version of the disposable filter of first purifying device 30. In the preferred embodiment, the filter employed is L400, supplied by Parker-Hannifen.

A moisture indicator 94 is located directly after third purifying device 92. Moisture indicator 92 comprises any device which indicates the degree of moisture present within the refrigerant flowing therethrough. In the presently preferred embodiment, the moisture indicator 94 comprises a disposable indicator paper which changes color in order to indicate whether or not moisture has been sufficiently eliminated. One such moisture indicator presently used is Sporlan model NIF1/2C, supplied by Sporlan Valve Company, St. Louis, Mo.

Figure 2:
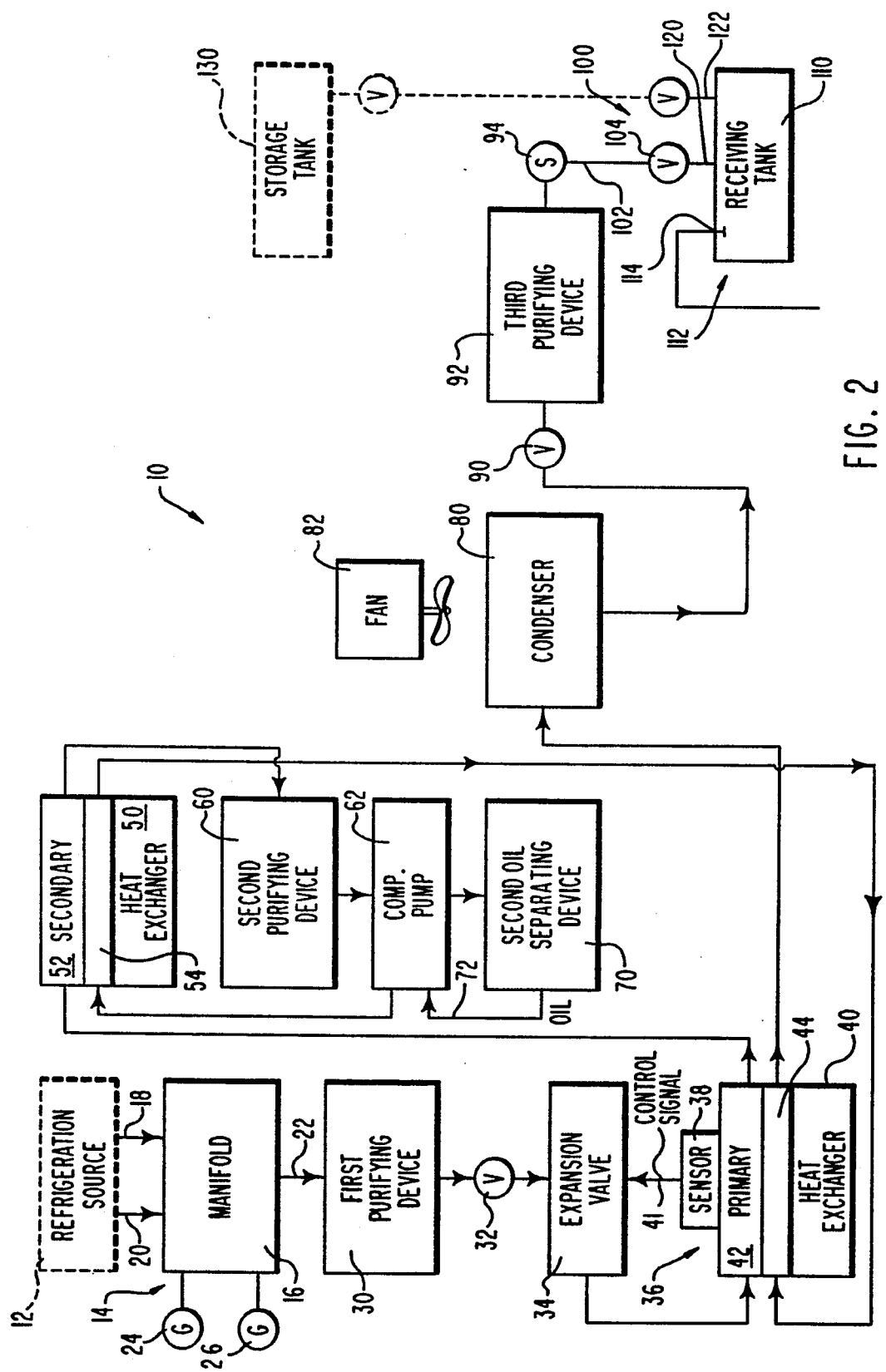
FIG. 2 is a schematic diagram of the refrigerant recycling apparatus utilizing a second oil separating device located before the condenser.

As can be seen in FIG. 2, following moisture indicator 94, the pressurized, condensed, predominantly liquid refrigerant may flow through an output conduit system 100, comprising a hose 102 and a valve 104 into a receiving tank 110. Receiving tank 110 preferably comprises a quantity-sensing device 112 which senses the amount of refrigerant in the receiving tank. Quantity-sensing device 112 may comprise a weighing means for weighing the tank and refrigerant. Preferably, however, it comprises a float 114 which senses the level of liquid in the tank. The quantity-sensing device actuates a relay 210 (see FIG. 3) which in turn turns off the power to the compressor-pump when needed. Preferably the configuration will be such that power is turned off when the quantity of refrigerant in the tank reaches 80% of capacity. This conforms with Underwriters Laboratories present standards.

The receiving tank preferably comprises a Department of Transportation approved re-usable cylinder, having a liquid port 120 and a vapor port 122 accessible from the top. Air, or other gases, may be purged through port 122 into the atmosphere.

Once the refrigerant is contained within the receiving tank the liquid port may be connected to the refrigerant source, through the manifold, and the refrigerant reintroduced into the refrigerant source. Alternatively the refrigerant may be introduced into a storage tank 130. As another alternative, the liquid port may be connected to the input conduit system, and recirculated through the apparatus.

It can also be appreciated that the refrigeration may pass directly from the apparatus to the storage tank without first passing through a receiving tank.

In an alternate embodiment within the scope of the present invention, as seen in FIG. 2, the refrigerant may flow through a second oil separating device 70 after flowing through the compressor-pump. Second oil separating device 70 comprises a separator wherein oil, which may have been introduced into the refrigerant as it flowed through the compressor-pump, is separated from the refrigerant. This oil would be wasted if not recaptured and returned to the compressor. Preferably, however, the oil is circulated back into the compressor-pump by way of conduit 72. The oil may be fed back into the crank case of the compressor-pump, or back into the compressor-pump's incoming refrigerant conduit. Preferably conduit 72 is a capillary tubing sized such that the pressure in second oil separating device 70 drives the separated oil back to the compressor-pump with the oil pressure being reduced to a value compatible with the pressure at the compressor-pump, i.e., slightly above the pressure in the compressor-pump. As one example, a capillary tubing approximately thirty-five feet long, and having an internal diameter of approximately 0.026 inches, has been found to be satisfactory. Oil separating device 70 may comprise any suitable commercial model. Once such preferred oil separator is Temprite Model Number 341, supplied by Temprite. An alternate preferred method is to utilize an oil separator with an automatic float to return oil to the compressor.

The apparatus may also be utilized to leak test the refrigerant source. For this application air, or nitrogen, or other suitable fluid may be run through the system and stored under pressure in the receiving tank. Valve 32 may then be closed, and the pressurized fluid introduced into the refrigerant source by way of the manifold 16. Gauges 24 and 26 will indicate the existence of a leak by a steadily dropping pressure. An alternate method is to pressurize the refrigerant source, and then with the use of an ultrasonic leak detector, detect any minute leaks. In this case, the compressor-pump may be kept in operation within limited pressure.

The apparatus may also be utilized to remove particles and contaminants from the refrigerant source. Pressurized air in the receiving tank may be utilized to blow out such particles from the refrigerant source. In this application the compressor-pump may be kept in operation.

The present invention may also operate as a vacuum pump for evacuating contaminants remaining in a depressurized system prior to reintroduction of clean refrigerant. The present invention is also capable of blowing out obstructions in a blocked system. The present invention can quickly reintroduce refrigerant into repaired refrigeration units or other refrigerant source by building up pressure in the invention, then quickly injecting the liquid refrigerant.

Figure 3:
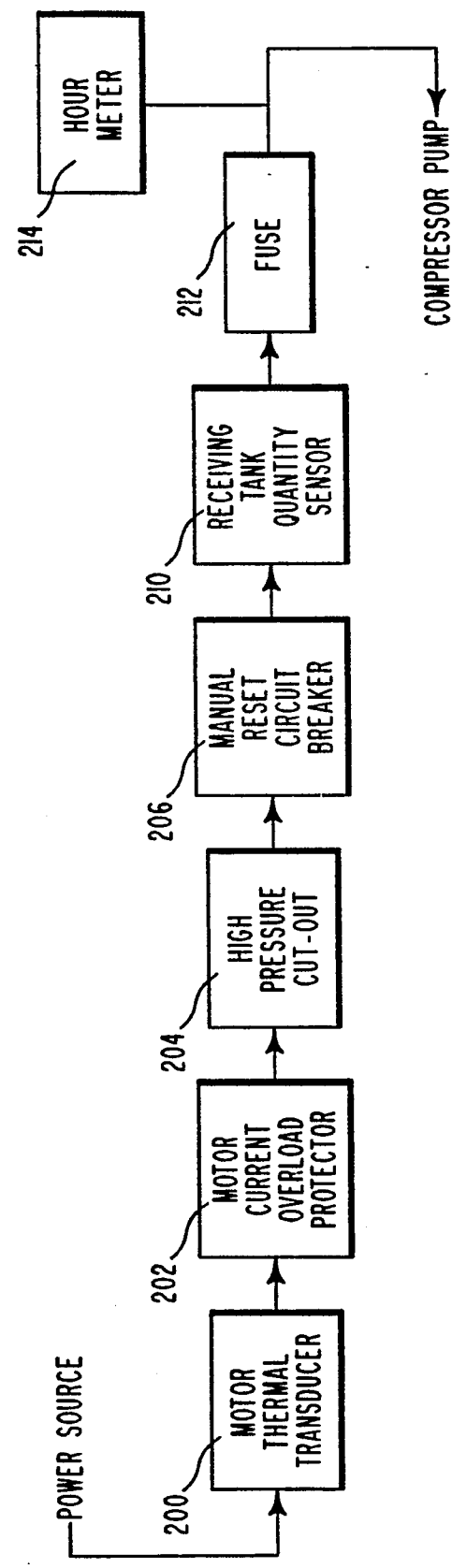
FIG. 3 is a schematic diagram showing the safety devices connected in series with power to the apparatus.

Preferably a usage indicator 214 is also incorporated (see FIG. 3). This preferably comprises an hour meter which indicates the time of usage. Alternatively, it may be a counter which counts the number of times the purification apparatus has been used, or alternatively, it may monitor the amount of refrigerant which has been purified since the filters were last changed, thus functioning to monitor when the filters need replacing.

Other miscellaneous control and safety devices may be incorporated as desired (see FIG. 3). (It should be appreciated, however, that the sequence in FIG. 3 is only illustrative, and not limited to that particular order of sequence.) One example is a motor thermal transducer 200 which monitors the motor temperature. Another example is a motor current overload protector 202 which responds to excessive motor current. Another example is a high pressure cut-out 204, configured to monitor the pressure following the compressor-pump. Other examples are a manual reset breaker 206 and a fuse 212. These devices are all well known in the industry and are not further described herein. They all serve to turn off power when necessary in order to protect operation of the apparatus.

Apparatus 10 comprises all the necessary conduits and valves needed to interconnect the various elements as described above, or as desired by the user. As these are well known devices, they are not further described herein.

Figure 4:
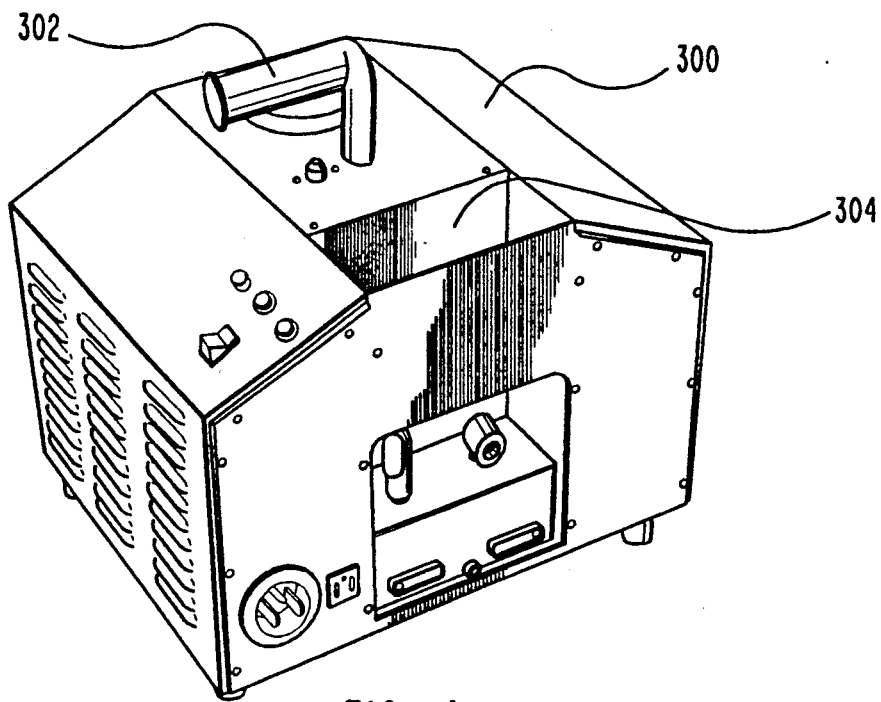
FIG. 4 is a perspective view of the refrigerant recycling apparatus as housed in a portable housing.

Additionally, a housing is employed. One type of housing comprises a portable housing. The portable housing may assume any one of a variety of configurations. A typical portable housing 300 is shown in FIG. 4. The dimensions of the preferred embodiment are approximately 14 inches in width, 18 inches in depth, and 17 inches in height. The weight is approximately 60 pounds. A handle 302 is incorporated, as shown. Filters 30 and 92 (not shown) are placed in a pocket 304, placed so as to be readily accessible without the use of tools, and yet protected.

Figure 5:
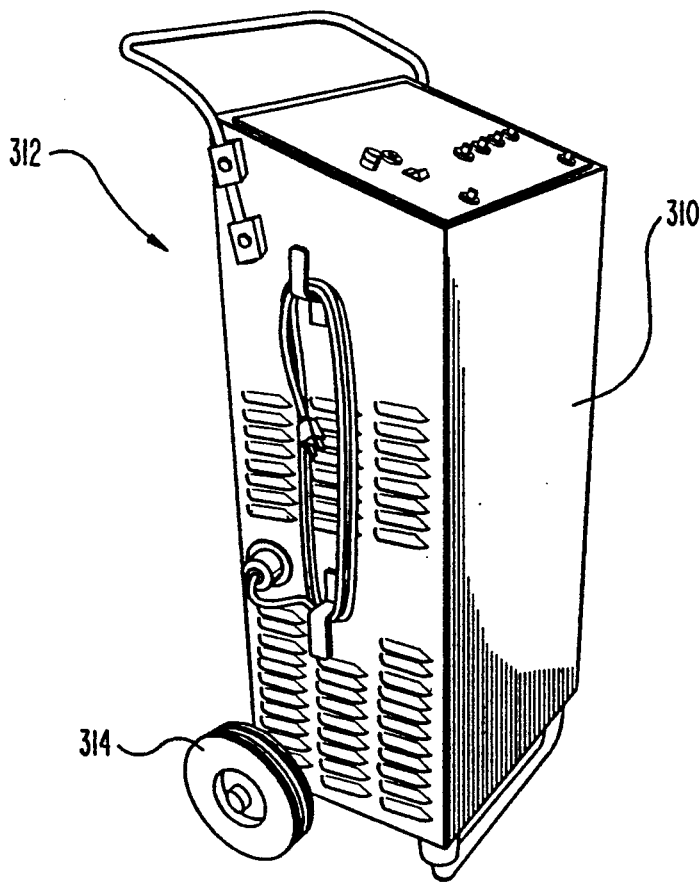
FIG. 5 is a perspective view of the refrigerant recycling apparatus as housed in a housing particularly configured for usage in a shop.

An alternative housing 310, mounted on a hand truck and intended primarily for shop usage, such as for servicing automotive air conditioners, is shown in FIG. 5. In the preferred embodiment, the dimensions are approximately 18 inches in width, 14 inches in depth, and 48 inches in height. The weight is approximately 150 pounds. Wheels such as 314 are incorporated. As before, filters 30 and 92 (not shown) are emplaced so as to be readily accessible without the use of tools, in this case being accessible from the rear through an opening.

The present invention also provides within its scope a system for purification of fluid refrigerants contained in an eternal refrigerant source. The system comprises a first filter means for at least partially purifying the refrigerant, an expansion means for expanding the refrigerant so as to convert it to a predominantly gaseous phase, a heat exchanger for increasing the thermal content of the predominantly gaseous refrigerant by exchanging heat to it from downstream refrigerant which has been processed so as to be in a pressurized, higher-temperature phase. The present invention also provides for the first separator to separate oil from the predominantly gaseous refrigerant, a compressor-pump for pressurizing the predominantly gaseous refrigerant. The system also comprises a second separator for separating oil from the predominantly gaseous refrigerant, a condenser for condensing the pressurized predominantly gaseous refrigerant so as to convert it to a pressurized, condensed, predominantly liquid phase, a heat exchanger for decreasing the thermal content of the pressurized refrigerant by exchanging heat to lower-temperature upstream refrigerant and a second filter for further purifying the pressurized, condensed, predominantly liquid refrigerant.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A refrigerant recycling apparatus for recovery and purification of refrigerant comprising:
   a) an input conduit system for connecting a refrigerant source to the refrigerant recycling apparatus;
   b) a first purifying device for removing moisture and particulates from the refrigerant, said first purifying device being in communication with said input conduit system, said first purifying device being located in an accessible area for convenient servicing and repair;
   a primary heat exchanger configured so as to provide heat to the refrigerant thereby causing the refrigerant to be vaporized;
   d) a secondary heat exchanger for further heating of the refrigerant to further assist in vaporization of the refrigerant;
   e) an expansion valve located prior in line to said primary and secondary heat exchangers for controlling the flow of the refrigerant and reducing the pressure of the refrigerant, thereby allowing the refrigerant to expand to a predominantly gaseous state;
   f) a second purifying device wherein oil is separated from the refrigerant;
   g) a compressor pump having a vacuum producing inlet and a pressure producing outlet, the pump being a hermetically sealed, lubricated-for-life positive displacement pump;
   h) a condenser;
   i) a third purifying device for removing moisture, acids, and other particulates from the refrigerant passing therethrough, the third purifying device being located such that the third purifying device is easily accessible for cleaning; and
   j) an interconnecting conduit system configured so as to interconnect the input conduit system, the primary heat exchanger, the secondary heat exchanger, the expansion valve, the compressor pump; the condenser, the first, second, and third purifying devices, and the refrigerant source.

2. A refrigerant recycling apparatus as defined in claim 1, wherein the first purifying device is a disposable filter capable of removing moisture, acids, and particulates from the gaseous and liquid refrigerant.

3. A refrigerant recycling apparatus as defined in claim 1, wherein the expansion valve is an automatic pressure reducing expansion valve.

4. A refrigerant recycling apparatus as defined in claim 1, wherein the expansion valve comprises a temperature sensing expansion valve in communication with said primary heat exchanger, wherein the pressure reduction is regulated by the temperature of the heat exchanger as sensed by said temperature sensing expansion valve.

5. A refrigerant recycling apparatus as defined in claim 1, wherein the second purifying device comprises a separator capable of separating oil and moisture from the refrigerant.

6. A refrigerant recycling apparatus as defined in claim 1, wherein the third purifying device comprises a disposable filter capable of removing moisture, acids and other particulates from the refrigerant passing therethrough, the filter being located such that the filter is easily accessible for servicing.

7. A refrigerant recycling apparatus as defined in claim 1, wherein the input conduit system comprises;
 a) a manifold having connected thereon at least one pressure gauge;
 b) at least one hose connecting the manifold to the refrigerant source; and
 at least one hose connecting the manifold with the refrigeration recycling apparatus.

8. A refrigerant recycling apparatus as defined in claim 1 further comprising an output conduit system for transporting the refrigerant from the refrigerant recycling apparatus to an outside storage area.

9. A refrigerant recycling apparatus as defined in claim 1, further comprising a moisture indicator located in a position after said third purifier device so as to measure the degree of moisture present within the refrigerant after the refrigerant has flowed through the third purifying device.

10. A refrigerant recycling apparatus as defined in claim 1, further comprising a receiving tank in communication with said third purifying device positioned so as to receive the refrigerant as it exits the refrigerant recycling apparatus.

11. A refrigerant recycling apparatus as defined in claim 10, wherein the receiving tank comprises a quantity-sensing device for sensing the level of liquid in the receiving tank.

12. A refrigerant recycling apparatus as defined in claim 10, wherein the receiving tank comprises a quantity-sensing device for sensing the weight of the fluid in the receiving tank.

13. A refrigerant reclaiming apparatus as defined in claim 1, further comprising a second oil separating device on communication with said compressor-pump for further separating oil from the refrigerant before passage of the refrigerant to the condenser.

14. A refrigerant recycling apparatus for recovery and purification of refrigerant comprising:
 a) an input conduit system for connecting a refrigerant source to the refrigerant recycling apparatus;
 b) a first disposable filter capable of removing moisture and particulates from the refrigerant, said disposable filter being located such that the filter is easily accessible for service;
 c) a primary heat exchanger configured so as to provide heat to the refrigerant thereby causing the refrigerant to be vaporized;
 d) a secondary heat exchanger for further heating of the refrigerant to further assist in vaporization of the refrigerant;
 e) an expansion valve located prior in line to said primary and secondary heat exchangers for controlling the flow of the refrigerant and reducing the pressure of the refrigerant, thereby allowing the refrigerant to expand to a predominantly gaseous state;
 f) a separator for removing oil from the refrigerant;
 g) a compressor pump having a vacuum producing inlet and a pressure producing outlet, the pump being a hermetically sealed, lubricated-for-life positive displacement pump;
 h) a condenser for cooling the refrigerant;
 i) a second disposable filter for removing moisture, acids, and other particulates from the refrigerant passing therethrough, said disposable filter being located in an area easily accessible for servicing;
 j) an interconnecting conduit system for interconnecting the input conduit system, the first and second disposable filters, the heat exchangers, the compressor pump, the condenser, the expansion valve, and the refrigerant source;
 k) a moisture indicator located after the second disposable filter, for measuring the degree of moisture present within the refrigerant after the refrigerant has flowed through the second disposable filter.

15. A refrigerant recycling apparatus as defined in claim 14, further comprising a second oil separating device in communication with said compressor-pump for further separating oil from the refrigerant before passage of the refrigerant to the condenser.

16. A refrigerant recycling apparatus as defined in claim 14, further comprising a receiving tank in communication with said purifying device positioned so as to receive the refrigerant as it exits the refrigerant recycling apparatus.

17. A refrigerant recycling apparatus as defined in claim 14, wherein the receiving tank comprises a quantity-sensing device for sensing the level of liquid in the receiving tank.

18. A refrigerant recycling apparatus as defined in claim 14, wherein the receiving tank comprises a quantity-sensing device for sensing the weight of the fluid in receiving tank.

19. A refrigerant recycling apparatus as defined in claim 14, wherein the input conduit system comprises;
 a) a manifold having connected thereon at least one pressure gauge;
 b) at least one hose connecting the manifold to the refrigerant source; and
 c) at least one hose connecting the manifold with the refrigeration recycling apparatus.

20. A refrigerant recycling apparatus as defined in claim 14, further comprising a housing configured so as to contain said apparatus within one compartment.

21. A refrigerant recycling apparatus as defined in claim 14, further comprising a usage indicator configured so as to monitor the degree of usage of the refrigerant recycling apparatus so as to monitor when said disposable filters need replacing.

22. A method for purification of fluid refrigerant contained in an external refrigerant source comprising the following sequential steps: removing, at least partially, moisture and other contaminants from said refrigerant; expanding said refrigerant and thereby converting it to a predominantly gaseous refrigerant by flowing it through an expansion valve; converting said refrigerant to a substantially gaseous refrigerant by exchanging heat to it, by means of at least one heat exchanger; separating oil from said substantially gaseous refrigerant; pressurizing said substantially gaseous refrigerant by means of a compressor-pump, thereby converting it to a pressurized predominantly gaseous refrigerant; condensing said pressurized predominantly gaseous refrigerant so as to convert it to a pressurized, condensed, predominantly liquid refrigerant; and removing moisture from the pressurized, condensed, predominantly liquid refrigerant.

23. A method for purification of fluid refrigerant as defined in claim 22, further comprising a procedure of repeating the steps until a desired degree of purification has been achieved.

24. A method for purification of fluid refrigerant as defined in claim 22, further comprising a secondary heat exchanger.

25. A method for purification of fluid refrigerant contained in an external refrigerant source comprising the following sequential steps:
   a) interconnecting said external refrigerant source with a refrigeration utility system, comprising: an input conduit system, a first purifying device, an expansion valve, a primary heat exchanger, a secondary heat exchanger, a secondary purifying device, a compressor-pump, a third purifying device, a condenser, an output conduit system, and an interconnecting valve and conduit system;
   b) at least partially purifying the fluid refrigerant by flowing the refrigerant through the first purifying device, said first purifying device being so configured as to at least partially filter out moisture, acids, and particulates, and positioned so as to be readily accessible to an operator for servicing;
   c) converting the partially purified refrigerant to a predominantly gaseous refrigerant by flowing the refrigerant through the expansion valve, the expansion device being configured to control the flow of the refrigerant and reduce the pressure of the refrigerant;
   d) adding heat to the now predominantly gaseous refrigerant by flowing the refrigerant through the primary heat exchanger, thereby converting the refrigerant to a substantially gaseous refrigerant;
   e) further heating the refrigerant by flowing the refrigerant through a secondary heat exchanger, thereby further converting said refrigerant to a gaseous refrigerant;
   f) further purifying the now substantially gaseous refrigerant by flowing the refrigerant through the second purifying device, said second purifying device being so configured as to separate out oil;
   g) pressurizing the substantially gaseous refrigerant by flowing the refrigerant through the compressor-pump;
   h) cooling and condensing the pressurized refrigerant, thereby converting the refrigerant to a pressurized, condensed, predominantly liquid refrigerant by flowing the refrigerant through the condenser, cooling the refrigerant so as to have a temperature somewhat above the temperature of the refrigerant existing the expansion valve; and
   i) further purifying the pressurized, condensed, predominantly liquid refrigerant by flowing it through the third purifying device, thereby separating moisture, acids and other particulates from the refrigerant.

26. A method for purification of fluid refrigerant as defined in claim 25, further comprising the steps of:
   a) further flowing the pressurized, condensed, predominantly liquid refrigerant into a receiving tank; and
   b) monitoring the moisture present in the refrigerant after the refrigerant has passed through the third purifying device.

27. A method for purification of fluid refrigerant contained in an external refrigerant source comprising the following sequential steps:
   a) interconnecting said external refrigerant source with a refrigerant utility system, comprising: input conduit means, a first purifying device, an expansion valve, a primary heat exchanger, a secondary heat exchanger, a second purifying device, a compressor-pump, a second oil separator device, condenser, a fourth purifying device, a moisture indicator, output conduit means, and an interconnecting valve and conduit system;
   b) at least partially purifying the contaminated fluid refrigerant by flowing the refrigerant through the first purifying device, said first purifying device being so configured as to at least partially filter out moisture, acids, and particulates, and placed so as to be readily accessible to an operator for servicing;
   c) converting the partially purified refrigerant to a predominantly gaseous refrigerant by flowing the refrigerant through the expansion valve;
   d) adding heat to the now predominantly gaseous refrigerant by flowing the refrigerant through the primary heat exchanger;
   e) adding additional heat to the predominantly gaseous refrigerant, thus converting the refrigerant to a substantially gaseous refrigerant, by flowing the refrigerant through the secondary heat exchanger;
   f) further purifying the now substantially gaseous refrigerant by flowing the refrigerant through the second purifying device, said second purifying device being so configured as to separate out oil;
   g) pressurizing the substantially gaseous refrigerant by flowing the refrigerant through the compressor-pump;
   h) further purifying the now pressurized refrigerant by flowing the refrigerant through the second oil separator device, said second oil separator device being so configured as to separate out oil;
   i) cooling and condensing the pressurized refrigerant, thereby converting the refrigerant to a pressurized, condensed, predominantly liquid refrigerant by flowing the refrigerant through the condenser;
   j) further purifying the pressurized, condensed, predominantly liquid refrigerant by flowing the refrigerant through the third purifying device; and
   k) monitoring the moisture present in the refrigerant after the refrigerant has passed through the third purifying device.

28. A method for purification of fluid refrigerant as defined in claim 27, further comprising the steps of:
   a) further flowing the pressurized, condensed, predominantly liquid refrigerant into a receiving tank;
   b) sensing the amount of liquid refrigerant present in said receiving tank.

29. A method for purification of fluid refrigerant as defined in claim 27, wherein the step of converting the partially purified refrigerant to a predominantly gaseous refrigerant by flowing it through the expansion valve further comprises using a temperature sensing device configured so as to sense the temperature of at least a portion of at least one heat exchanger, develop a control signal as a function of said temperature, and transmit said control signal to said expansion valve which is configured so as to respond to said control signal and thereby control the flow of liquid therethrough such that the refrigerant exists in a substantially gaseous phase.

30. A method for purifying of fluid refrigerant as defined in claim 27, wherein the step of converting the partially purified refrigerant to a predominantly gaseous refrigerant by flowing the refrigerant through the expansion device comprises using an automatic pressure reducing expansion valve.

31. A system for purification of fluid refrigerant contained in an external refrigerant source, comprising, in serial functional relationship: first filter means for at least partially purifying said refrigerant; expansion means for expanding said refrigerant so as to convert it to a predominantly gaseous phase; heat exchanger means for increasing the thermal content of said predominantly gaseous refrigerant by exchanging heat to it from downstream refrigerant which has been processed so as to be in a pressurized, higher-temperature phase; first separator means for separating oil from said predominantly gaseous refrigerant; compressor-pump means for pressurizing said predominantly gaseous refrigerant; second separator means for separating oil from the now pressurized predominantly gaseous refrigerant; condenser means for condensing said pressurized predominantly gaseous refrigerant so as to convert it to a pressurized, condensed, predominantly liquid phase; said heat exchanger means for decreasing the thermal content of said refrigerant by exchanging heat to lower-temperature upstream refrigerant; and second filter means for further purifying the pressurized, condensed, predominantly liquid refrigerant.

32. A system for purification of contaminated fluid refrigerant as defined in claim 31, further comprising circulation means for repetitively recirculating the pressurized, condensed, predominantly liquid refrigerant back through the system until a desired degree of purification has been achieved.

* * * * *